United States Patent [19]

Grant et al.

[11] 4,267,951
[45] May 19, 1981

[54] TAPE GUIDING METHOD AND APPARATUS

[75] Inventors: Frederic F. Grant, Bellflower; Henry M. Martija, La Verne, both of Calif.

[73] Assignee: Bell & Howell Company, Chicago, Ill.

[21] Appl. No.: 58,225

[22] Filed: Jul. 16, 1979

[51] Int. Cl.³ .......................................... B65H 23/08
[52] U.S. Cl. ...................................... 226/195; 242/76
[58] Field of Search ................... 226/1, 11, 7, 97, 180, 226/195, 196; 274/4, 11; 242/55.12, 55.19 A, 76, 195

[56] References Cited

U.S. PATENT DOCUMENTS

| | | | |
|---|---|---|---|
| 2,706,638 | 4/1955 | Bruderlin et al. | 274/4 |
| 2,862,715 | 12/1958 | MacDonald | 274/11 |
| 2,894,702 | 7/1959 | Heath et al. | 242/76 |
| 2,916,228 | 12/1959 | Wellington | 242/76 |
| 3,143,270 | 8/1964 | Cohen | 226/196 |
| 3,243,089 | 3/1966 | Cvacho et al. | 226/180 |
| 3,281,040 | 10/1966 | Grant | 226/97 |
| 3,294,330 | 12/1966 | Campbell | 242/55.12 |
| 3,494,525 | 2/1970 | Wiig | 226/11 |
| 3,536,239 | 10/1970 | Strong | 226/1 |
| 3,799,422 | 3/1974 | Matsumoto | 226/196 |
| 3,967,788 | 7/1976 | Ponce | 242/55.19 A |
| 4,091,979 | 5/1978 | Browder | 226/7 |

Primary Examiner—Leonard D. Christian
Attorney, Agent, or Firm—Benoit Law Corporation

[57] ABSTRACT

A tape guide has a tape supporting surface extending across a major surface of an advancing tape at a supporting region extending from a tape touchdown region to a tape liftoff region. The tape guide stresses the advancing tape with the tape supporting surface uniformly across the tape and at both tape edges. A reference surface extends at an acute angle to the supporting surface between and exclusive of the tape touchdown and liftoff regions in order to position the advancing tape at one of its tape edges.

32 Claims, 6 Drawing Figures

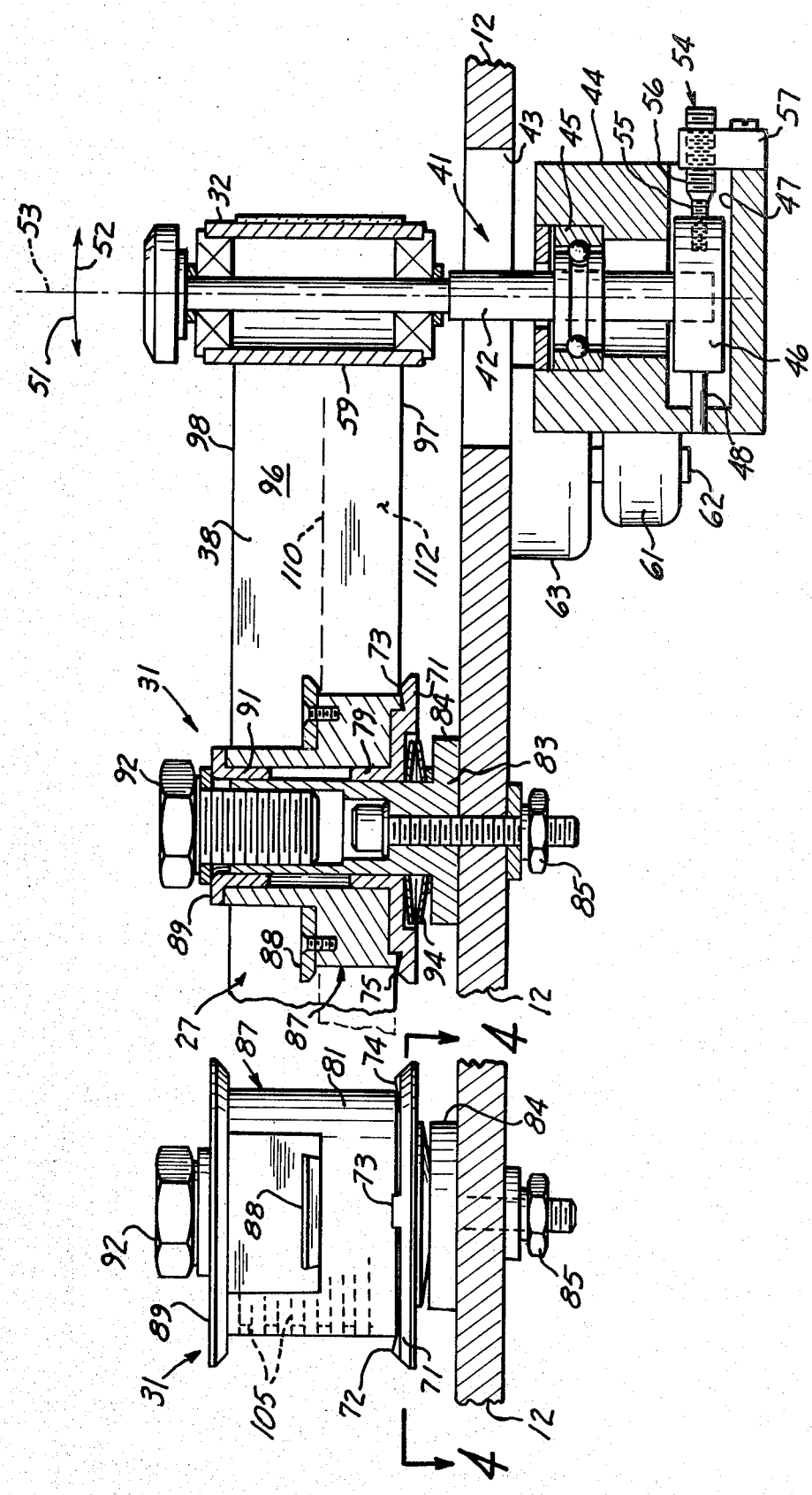

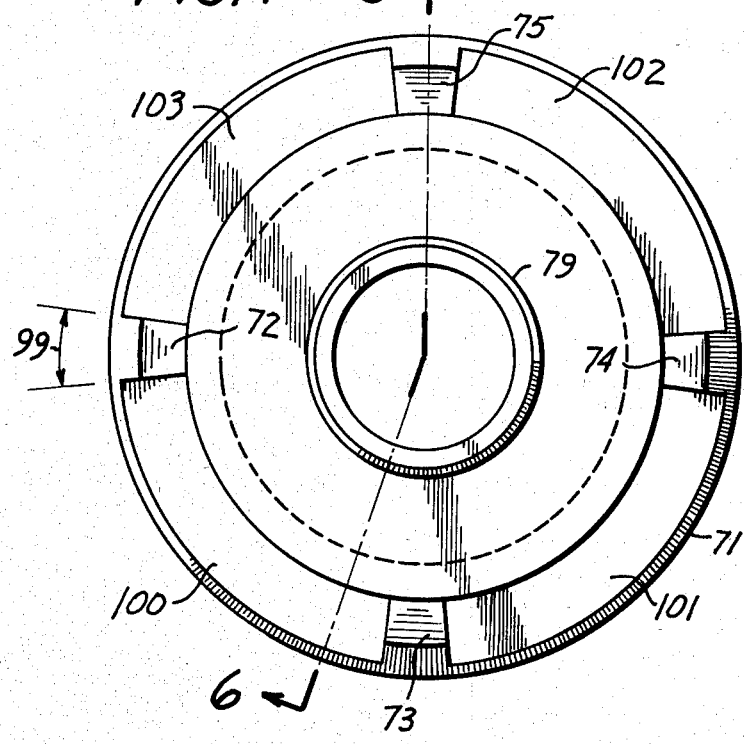
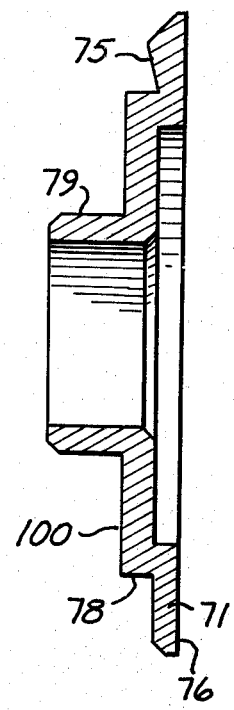
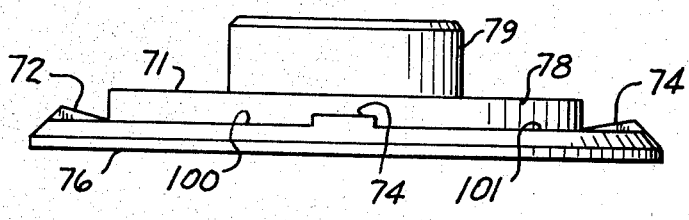

TAPE GUIDING METHOD AND APPARATUS

BACKGROUND OF THE INVENTION

1. Field of the Invention

The subject invention relates to methods and apparatus for guiding a tape and, for instance, has utility in magnetic tape transports, photographic film handling apparatus and other tape or web transporting or handling equipment wherein precision guidance of a tape, film or other web is required or desired.

2. Disclosure Statement

This disclosure statement is made pursuant to the duty of disclosure imposed by law and formulated in 37 CFR 1.45(a). No representation is hereby made that information thus disclosed in fact constitutes prior-art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material.

Throughout the years, many precision guiding techniques and apparatus have been proposed or implemented. By way of example, and not by way of limitation, precision guiding of a tape or web is important in information processing or handling equipment wherein a tape or web-shaped information carrier needs to be accurately positioned relative to information recording and playback devices.

Many proposed systems for the sidewise alignment of a longitudinally moving strip are not suitable in practice for most precision guidance purposes. For instance, the system disclosed in U.S. Pat. No. 3,243,089, by D. S. Cvacho et al., issued Mar. 29, 1966, employs a number of grooved wheels into which slanted rollers push a strip of material, such as employed in the manufacture of cylindrical metal containers. Such rugged handling of material would severely wear and damage most tape materials and would at any rate not afford the commonly requisite precision of guidance.

Another example of a past proposal unsuitable for present purposes may be seen in U.S. Pat. No. 3,536,239, by Grant F. Strong, issued Oct. 27, 1970. In particular, that proposal employs a pulley device for guiding and untwisting elastomer extrusions. To this end, Strong's pulley device has a base composed of tapered surfaces and bounded by convex sheaves or then by concave or inwardly slanted sides. In practice, such sheaves or sides would interfere with tape entry and exit, if such a pulley device were attempted to be employed as a tape guide.

The latter drawback would also attach to attempts to employ as tape guides slanted rollers with sheaves or sides extending at right angles to a cylindrical roller body, as shown, for instance, in U.S. Pat. No. 2,706,638, by H. H. Bruderlin et al, issued Apr. 19, 1955.

Several other proposals have attempted to realize tape transport or guiding systems with the aid of slanted or tapered rollers or guides, as may be seen from U.S. Pat. Nos. 3,967,788, 3,799,422, 3,494,525, 3,294,330, 3,143,270, 2,916,228, 2,894,702 and 2,862,715. The drawback of such systems customarily resides in an imposition of uneven stresses across the tape surface. For instance, the latter U.S. Pat. No. 2,862,715, by D. N. MacDonald, issued Dec. 2, 1958, proposes the use of several tape guides, each having a tapered body bounded by a reference surface extending at right angles to a longitudinal axis through the tapered body. The tapered body, which acts as a tape guide, imposes on the advancing tape a transverse force component by stressing the advancing tape unevenly across its major tape surface. In particular, that tapered guide stresses one edge of the advancing tape more than the other, thereby loading the tape against the straight reference shoulder provided at the base of the tapered body. This, in turn, has the drawback of prompting the tape to ride up or curl up on the reference shoulder, thereby adding further wear and tear to the wear and tear already occasioned by the uneven stresses imposed on the tape by the tapered guide.

A further type of web guide is apparent from U.S. Pat. No. 3,281,040, by F. F. Grant, issued Oct. 25, 1966. According to that proposal, a positive pressure gradient is established at the guiding element so that the moving web tends to slide "downhill" of the gradient and the edge of the web adjacent a guiding shoulder is brought into contact with that shoulder. Web guides of this type are useful in some applications but tend to be relatively long, bulky and air consumptive.

Further tape guide systems are apparent from U.S. Pat. No. 4,091,979, by L. B. Browder, issued May 30, 1978 to the subject assignee. While those systems afford a very high tape guiding precision, they would share with conventional approaches the disadvantage of tape curlup, if they employ a straight reference shoulder extending at right angles to the tape guiding surface. Such systems are further vulnerable to the effects of tape width variation or non-straightness of tape edges. Even with high-quality tape, variations of the order of 0.002/0.003 inches (50–75$\mu$) are relatively frequent and result in a substantial variation of the force between the tape edge and adjacent reference shoulder, eventuating curling of the tape edge and climbing thereof onto the reference surface.

SUMMARY OF THE INVENTION

It is a general object of this invention to overcome the disadvantages and to meet the needs expressed or implicit in the above disclosure statement or otherwise set forth herein.

It is a related object of this invention to guide a tape or web; with "tape" and "web" being employed herein as equivalent expressions.

It is a germane object of this invention to provide improved methods and apparatus for guiding a tape.

It is also an object of this invention to provide improved tape transports.

It is a related object of this invention to provide improved magnetic tape or other information recording equipment.

It is also an object of this invention to provide improved tape guides.

Other objects of this invention will become apparent in the further course of this disclosure.

From a first aspect thereof, the subject invention resides in a method of guiding a tape having a major tape surface extending between parallel tape edges, comprising in combination the steps of providing a tape guide including a tape supporting surface for supporting the tape across said major tape surface, advancing the tape in a direction parallel to said edges, supporting the advancing tape with the tape supporting surface at a supporting region extending from a tape touchdown region to a tape liftoff region, stressing the advancing tape with said guide including said supporting surface uniformly across the tape and at both of said edges, positioning the tape at one of the tape edges with the aid of a reference surface, sloping said reference surface at an acute angle to said supporting surface, and limiting the extent of said reference surface in the direction of advance of the tape to a tape positioning region between the tape touchdown and liftoff regions.

From another aspect thereof, the subject invention resides in a method of guiding a tape having a major tape surface extending between parallel tape edges, comprising in combination the steps of providing a tape guide including a tape supporting surface for supporting the tape across said major tape surface, advancing the tape in a direction parallel to said edges, supporting the advancing tape with the tape supporting surface, stressing the advancing tape with said guide including said supporting surface uniformly across the tape and at both of said edges, positioning the tape at one of the tape edges with the aid of a reference surface, sloping said reference surface at an acute angle to said supporting surface, and limiting said reference surface in the direction of advance of the tape to an extent corresponding to only a portion of the tape supporting surface in said direction.

From another aspect thereof, the subject invention resides in apparatus for guiding a tape having a major tape surface extending between parallel tape edges and advancing in a direction parallel to said edges, comprising, in combination, means extending across the major tape surface for supporting the advancing tape at a supporting region extending from a tape touchdown region to a tape liftoff region and including a tape supporting surface, means for stressing the advancing tape with said supporting means including the tape supporting surface uniformly across the tape and at both of said edges, including means for mounting said supporting surface, and means for positioning the tape at one of the tape edges, including a reference surface extending at an acute angle to said supporting surface between and exclusive of the tape touchdown and liftoff regions.

From another aspect thereof, the subject invention resides in apparatus for guiding a tape having a major tape surface extending between parallel tape edges and advancing in a direction parallel to said edges, comprising, in combination, means extending across said major tape surface for supporting the advancing tape, including a tape supporting surface, means for stressing the advancing tape with said supporting means including the tape supporting surface uniformly across the tape and at both of said edges, including means for mounting said supporting surface, and means for positioning the tape at one of the tape edges, including a reference surface extending at an acute angle to said supporting surface and extending for a length corresponding to only a portion of the tape supporting surface in the direction of tape advance.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which:

FIG. 2 is a view, on an enlarged scale, taken along the line 2—2 in FIG. 1, and showing tape guiding methods and apparatus according to a preferred embodiment of the subject invention;

FIG. 3 is a view, on an enlarged scale, taken along the line 3—3 in FIG. 1, and showing a tape guide according to a preferred embodiment of the subject invention;

FIG. 4 is a tape guide part according to a preferred embodiment of the subject invention, as seen from the line 4—4 in FIG. 3 upon the removal of other components;

FIG. 5 is a top view of the tape guide part of FIG. 4; and

FIG. 6 is a section taken along the line 6—6 in FIG. 4.

DESCRIPTION OF PREFERRED EMBODIMENTS

Figure 1:
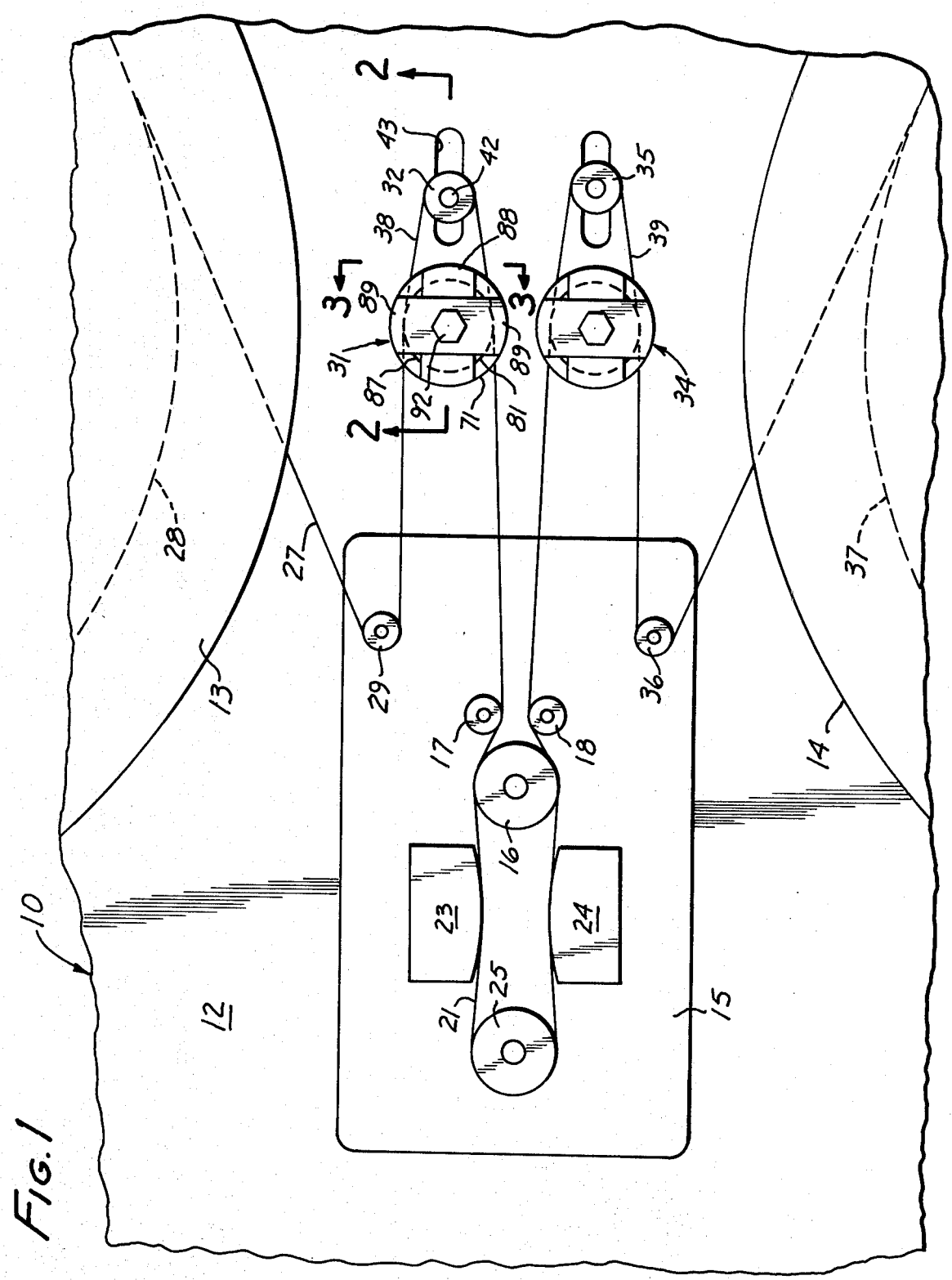
FIG. 1 is an elevation of a magnetic tape transport embodying the subject invention.

Briefly, the magnetic tape transport 10 shown in FIG. 1 has a baseplate or deck 12 rotatably supporting a tape supply reel 13 and a tape takeup reel 14.

The deck 12 includes an insert or precision plate 15 which rotatably supports a tape capstan 16. This capstan cooperates with a pair of tape entry and exit guides 17 and 18 in transporting tape through a closed loop 21 past record and reproduce head stacks 23 and 24 via a turnaround roller 25.

In the operation of the tape transport, magnetic recording tape 27 is advanced from a tape supply roll 28 on the reel 13 via a conventional tape guide 29 on the precision plate 15 to a tape guide or positioning device 31 embodying a preferred embodiment of the subject invention and thence to a loop sensing roller 32, back to positioning device 31, and on to guide 17, capstan 16, head stack 23, turnabout roller 25 in a closed loop 21, head stack 26, and capstan 16.

The tape capstan 16 may be driven by a conventional capstan drive with speed and servo loop control (not shown) in order to drive the tape through the closed loop 21 and to a further tape guide or positioning device 34 embodying a preferred embodiment of the subject invention, and to a further loop sensing roller 35.

The tape advances from the roller 35 back via the positioning device 34 and a guide 36 on the precision plate 15, to the takeup reel 14 to be wound into a tape roll 37 thereon.

If desired, the roller 25 may be replaced by a second tape drive capstan.

Those skilled in the art of instrumentation tape recorders and similar equipment will recognize that the tape transport 10 will in practice be equipped with reel hub assemblies which releasably carry the tape reels 13 and 14 and with reel drives which may be of a conventional type in order appropriately to drive the reels 13 and 14 of the tape transport. Equipment of this type typically employs the sensing rollers 32 and 35 for sensing the lengths of the tape loops at 38 and 39 in order to adjust tape tension by appropriate energization of the reel drives rotating or braking the tape reels 13 and 14, as required.

In practice, the tape 27 may run either from the reel 13 to the reel 14 as described above, or through the same tape path, including closed loop 21, from the reel 14 to the reel 13. In this respect, the tape transport shown in FIG. 1 is symmetrical as to its design and most of its components with respect to a plane of symmetry extending through the axes of the capstan 16 and turnabout roller 25. Accordingly, only the positioning device 31 with associated loop sensing roller 32 will be more specifically described in the following disclosure, with the understanding that the corresponding positioning device 34 and loop sensing roller 35 are of an identical nature, purpose and design, except as may be required by the fact that the design and arrangement of certain components, such as the mounting structure of either loop sensing roller present a mirror image of their corresponding equivalent.

Turning now to FIG. 2, a loop sensing mechanism 41 including the roller 32 will now be more specifically described.

In particular, the roller 32 is rotatably mounted on a shaft 42 which rides laterally in a slot 43 cut into the baseplate 12. The shaft is mounted in a cup 44 in which the outer race of a ball bearing 45 is releasably retained. The inner race of the ball bearing 45 mounts the shaft 42, which is thus tiltable together with the roller 32 rotatably mounted thereon.

The lower end of shaft 42 sits in a corresponding cavity of a block 46 which is slidable in a corresponding cavity 47 in the bottom region of the cup 44. A guide pin 48 extends from the bottom of the cavity 47 into a corresponding bore in the block 46 in order to guide that block for azimuth or tilting adjustment in the plane of the paper on which FIG. 2 has been drawn. FIG. 2 indicates the latter adjustment by arrows 51 and 52 relative to the axis of rotation 53 of the roller 32. A differential screw 54 has a first threaded portion 55 extending into a corresponding internal thread in the block 46, and a different second threaded portion 56 extending through a corresponding internal thread in a block 57 attached to the mounting cup 44. By rotation of the differential screw 54, the roller 32 with its axis of symmetry 53 and tape guiding or supporting surface 59 may be selectively tilted in the directions of the arrows 51 and 52 as shown in FIG. 2.

The mounting cup 44 sits at one end of an arm 61 which has its other end pivoted and attached to a shaft 62. The shaft 62, in turn, is part of a tape loop sensing system 63 which, as its name implies, senses the length of the tape loop 38. Those skilled in the art of instrumentation tape recorders and similar equipment will recall that loop sensing arms of the type of arm 61 are spring-loaded in practice, and that tape tension is set by such spring loading of the sensing rollers 32 and 35. The component 63 typically includes a potentiometer, an optical sensor, or another device for sensing the angular position of the arm 61. Also within the knowledge and skill of the state of the art, the component 63 typically is part of a servo system which, in conjunction with the above mentioned reel drives, adjusts the tape loop lengths at 38 and 39 in order to keep the sensing rollers 32 and 35 within the desired range of locations, to effect tape tension control through sensing of roller spring load.

In this respect, and in viewing FIG. 2, it may be recognized that the components 62 and 63, for the purpose of better visibility, have been shown somewhat to the side of their actual position. In particular, the sensor shaft 62 in a practical apparatus would more likely be in line with the roller shaft 42 in a view of the type shown in FIG. 2, so as to guide the shaft 42 more straightly in the corresponding slot 43. Such matters, of course, are mere design details.

No novelty is claimed herein for the loop sensing assembly 41 or for its illustrated and disclosed azimuth adjustment feature involving the differential screw 54.

In fact, the yaw force imposing devices disclosed in the above mentioned Browder U.S. Pat. No. 4,091,979 may be employed on the shaft 42 in lieu of the roller 32.

In either case, a yaw force or motion is imposed on the advancing tape so that it will be loaded at one edge thereof against a reference surface. In the illustrated embodiment, the main purpose of such tape edge positioning or precision guiding is to effect an exact positioning of the advancing tape 27 in the closed loop 21 relative to the recording and playback head stacks at 23 and 24. Especially in the case of multitrack recording and playback, it is very important that each recording and playback device work exactly within its associated track on the magnetic recording tape or other information recording medium.

The problem in this respect with prior-art tape guide reference surfaces extending at right angles to the major plane of the type has been a tendency of the tape to curl at its edge or to climb up on the reference surface or flange. This tendency in practice is aggravated by the fact that even high-grade recording tape has a certain non-straightness along its edges. By way of example, the width of the tape may vary some 0.002 to 0.003 inches (50–75 $\mu$). In the operation of the tape transport, such non-straightness results in variation in the force between the edge of the advancing tape and the reference surface of the guide, occasioning the above mentioned curling and climbing tendencies.

These and other drawbacks herein mentioned are avoided by the tape guiding methods, apparatus and devices of the subject invention. In this respect, reference should now be had to the tape guiding and positioning device 31 shown in FIGS. 1 to 6 in different views and to varying extents.

Basic to the tape positioning device according to the illustrated preferred embodiment of the subject invention is a flange providing or having, by way of example, four reference surfaces or surface facets 72, 73, 74 and 75. According to the illustrated preferred embodiments, each of the surfaces or facets 72 to 75 extends at an acute angle to a major plane 76 of the flange, as well as to various cylindrical surfaces, including the cylindrical outer surfaces of a stepped portion 78 and a tubular axial extension 79 of the flange 71 and a cylindrical tape guide or supporting surface 81 shown more fully in FIG. 3.

As shown in FIG. 2, the flange 71 is mounted on a cylindrical core 83 which extends through an axial bore of the tubular flange extension 79. The core 83 has a base or flange portion 84 which extends perpendicularly to the cylindrical mounting surface of the core.

The core 83 is mounted by a nut and bolt assembly 85 on the baseplate 12, with the core extending with its cylindrical mounting surface at right angles to the baseplate.

A tape guide 87 providing the above mentioned cylindrical tape supporting surface 81 sits on and is attached to the flange 71. First crossmembers 88 are attached to stepped portions of the guide 87, in order to assist the accommodation of tapes of a first width. Similarly, a second crossmember 89 sits on top of the guide 87 in order to assist the accommodation of wider tapes. While the crossmembers 88 and 89 have no guiding function as such, they do project above the tape supporting surfaces or tape paths, in order to curb loss of the tape from the guide, especially during installation of the tape on the transport or in the course of other instances of tape slackening.

It will be noted from FIG. 2 that the top crossmember 89 has a tubular extension 91 which, like the axial tubular extension 79 of the flange 71 protrudes into a cylindrical bore of the guide 87.

A bolt 92 is threaded into a central bore of the core 83 in order to releasably retain the tape guide and positioning assembly. To this end, a pair of Belleville springs 94 extend around the core 83 between its foot 84 and the corresponding portion of the flange 71. Upon tightening, the bolt 92 clamps the tape guide and positioning assembly against the bias of the Belleville springs 94 down on the mounting core foot 84 at the tape deck or baseplate 12.

In FIG. 2, the guide 31 is shown in position for guiding and positioning the wide tape 27. If accommodation of a narrower tape is desired, the bolt 92 may be loosened, the assembly including the flange 71 and guide 87 turned by an angle of 90°, and the bolt 92 retightened, in order to clamp down the guide 31 in that alternative angular position.

Different phases of the function of the tape guide and positioning device 31 will now be described with the aid of FIGS. 1 to 6.

In particular, the subject invention provides methods and apparatus for guiding a tape 27 having a major tape surface 96 extending between parallel tape edges 97 and 98. To this end, the invention provides a tape guide 87 including a tape supporting surface 81 for supporting the tape 27 across the major tape surface 96. The tape drive system, including the capstan 16, advances the tape in a direction parallel to the edges 97 and 98. Unlike prior-art slanted or tapered tape guides, the tape guide 87 does not attempt by itself to impose sideways motion on the tape for the purpose of loading the tape edge against a reference surface. In other words, unlike slanted or tapered guides, the tape guide 87 stresses the advancing tape with the guide 87 including the supporting surface 81 uniformly across the tape 27 and at both of the edges 97 and 98. To this end, the tape supporting surface 81 may, for instance, be made cylindrical according to the illustrted preferred embodiment.

In the illustrated embodiment, the means for stressing the advancing tape uniformly as just described, include not only the guide 87 and its cylindrical or equivalent surface 81, but also the mounting structure 83 to 85 which in effect supports the surface 81 as shown in FIGS. 2 and 3 in parallel to the average path of the major tape surface 96 in the transport 10.

It may in particular be noted in this respect that the tape supporting surface 81 is supported in parallel to the axis of rotation of the tape drive capstan 16. The tape 27 is positioned at one of the tape edges 97 with the aid of a reference surface 72. According to the subject invention, this reference surface is sloped at an acute angle to the supporting surface 81. This is contrary to the above mentioned prior-art reference surfaces which extend perpendicularly to the surface supporting the tape at its major tape surface.

Also according to the subject invention, the reference surface 72 is limited in the direction of advance of the tape 27 to an extent or length 99 corresponding to only a portion of the tape supporting surface 81 in that direction. In the illustrated preferred embodiment, the flange 71 for positioning the tape 27 via one of its edges 97 includes a reference surface 72 extending for a length 99 corresponding to only a portion of the tape supporting surface 81 in that direction of tape advance.

In the illustrated preferred embodiment, the tape loop sensor assembly 41 with its tape guide roller 32 and tilt adjustment facility 46 imposes on the advancing tape 27 at a distance from the device 31 or tape guide 87 a yaw force or motion loading the tape at one of the tape edges 97 against the reference surface 72. The subject invention then prevents the tape at that one edge 97 from curling or climbing up the reference surface 72.

The invention does so by sloping the reference surface 72 at an acute angle to the major tape supporting surface 81. The subject invention further prevents interference between the advancing tape 27 and the reference surface 72 by limiting the reference surface as mentioned above in the direction of tape advance to an extent 99 corresponding to only a portion of the tape supporting surface in that direction.

An embodiment of the latter principle will now be explained with the aid of the illustrated preferred embodiment.

In particular, it may easily be realized that an advancing tape does not encompass a tape guide about its entire surface. Rather, there is a region at the guide where the tape touches down onto the tape supporting surface of the guide, and there is further a region at the guide where the tape leaves the supporting surface or is lifted off therefrom. Accordingly, the area where the tape so-to-speak enters the guide is herein referred to as "tape touchdown region," while the area where the tape exits or leaves the guide is referred to as "tape liftoff region." The area of the supporting surface 81 located between the touchdown region and the liftoff region is referred to herein as "supporting region."

Viewing now for instance FIG. 1, it may be realized that the tape supporting region of the guide surface area 81 is so short between the tape touchdown region and the tape liftoff region that it is covered up from view by a portion of the overhanging crossmember 89.

In other words, the tape supporting region between the touchdown and liftoff regions is rather short in the embodiment of FIG. 1, since the advancing tape 27 in that transport merely touches the tape guide of the devices 31 and 34 laterally for a short distance. The sloped reference surface 72, as well as each of the other reference surfaces 73 to 75, is thus correspondingly short as shown in FIG. 4, inasmuch as the illustrated preferred embodiment prevents interference between the advancing tape 27 and the reference surface 72, etc. by limting the extent 99 of that reference surface in the direction of advance of the tape to the tape supporting region between the tape touchdown and liftoff region.

The reference surface extent 99 may, of course, be longer than as shown in FIG. 4 if the tape supporting region is longer between the tape touchdown region and tape liftoff region. For instance, the sloped reference surface may in practice extend about, say, one-half of the tape supporting surface if the tape extends for about 180° of the guide. In that case, there could, in terms of FIG. 4, be one arcuate sloped reference surface extending from the lower edge of the facet 72 around the upper region of the flange 71, including the facet 75, down to the lower edge of the facet 74.

In the illustrated preferred embodiment, the extent of each reference surface 72, etc., is limited to only a portion of the tape supporting surface 81, such as to the above mentioned tape positioning region, by providing depressions or flat lands 100, 101, 102 and 103 between the reference surfaces or facets 72, 73, 74 and 75.

By way of example, the depression 100 would thus correspond to the tape entry or touchdown region, while the depression 103 corresponds to the tape exit or liftoff region at the adjacent surface 81 of the guide 87.

The sloped reference surfaces 72 to 75 are maintained stationary during the advance of the tape 27. As already indicated above, the mounting core 83 with threaded bolt 92 serve to maintain such reference surfaces stationary, except for the above mentioned 90° adjustment between tape changes among different tape widths. In principle, and within the scope of the subject invention, the tape guide 87 with cylindrical supporting surface 81 could be rotary, such as by being mounted for rotation about a vertical axis. However, the guide 87 with surface 81 is also maintained stationary in the illustrated preferred embodiment, except for the mentioned tape width accommodation adjustments.

The tape guide 87 or supporting surface 81 need not be cylindrical in the manner shown in FIG. 3. However, it is generally curved in the direction of tape advance, with the sloped reference surface, such as the surface 72, being limited in the direction of curvature of the curved tape supporting surface to an extent corresponding to only a portion of the tape supporting surface in the direction of curvature.

The tape supporting surface may extend uniformly across the guide 87, as shown in the right-hand portion of FIG. 3. Alternatively, the tape guide 87 including the tape supporting surface 81 may be provided with indentations. The latter expression is intended to cover herein, for instance, grooves for avoiding air inclusions between tape and guide, and apertures for moving air relative to the tape through the guide and supporting surface. In this respect, FIG. 3 shows in dotted lines part of a series of circumferential grooves extending in the direction of tape advance and having been cut into the tape guide 87 at the tape supporting surface 81 to prevent air inclusions. Alternatively, apertures (not shown) may be provided in the tape guide 87 to blow air through the supporting surface 81 for an air bearing effect. In all these situations, the tape supporting surface 81 is still considered to extend across the major tape surface 96, even though such surface 81 may be interrupted or subdivided by grooves or other indentations.

While the yaw motion imposing means have been implemented in the preferred embodiment shown in FIGS. 1 and 2 in the form of a roller, having a cylindrical surface 59 mounted for rotation about an axis 53, the cylindrical surface 59 may in principle be stationary. In that case, an air bearing system may be employed for reducing the friction between tape 27 and guiding surface 59. Also, the surface for supporting the advancing tape at the yaw motion imposing means need not necessarly be cylindrical.

A yaw motion imposing device with a tapered or conical surface is, for instance, shown in the above mentioned Browder U.S. Pat. No. 4,091,979, which is herewith incorporated by reference herein.

Keeping these broadening principles in mind, it is seen that the tape guiding apparatus illustrated in FIGS. 1 to 3 comprises first tape guide means 87 extending across the major tape surface 96 for supporting the advancing tape, and includes a first tape supporting surface 81. That apparatus also includes second tape guide means 32 extending across the major tape surface 96 for supporting the advancing tape 27, and including a second tape supporting surface 59. FIG. 2 further shows means for stressing the advancing tape 27 with the first tape guide 87 including the first tape supporting surface 81 uniformly across the tape and at both tape edges 97 and 98. These means, as indicated above, include the core 83 and fasteners 85 and 92 connected to the tape guide 87 for mounting the first tape supporting surface 81.

The illustrated apparatus further includes components 44, 61 and 62 for mounting the second tape guide 32 in spaced relationship to the first tape guide 31 or 87. The tape transport further includes means 16, 17, 29, etc., for advancing the tape 27 in a loop-shaped tape path 38 relative to the first and second tape guide means 87 and 32. As shown at 38 in FIG. 1, that loop-shaped tape path 38 has a first leg portion touching the first tape supporting surface 81 on one side of the first tape guide 87, a second leg portion touching the first tape supporting surface 81 on another side of the first tape guide 87, and a bight portion interconnecting the first and second leg portions and extending about the second tape guide means 32 in contact with the second tape supporting surface.

Means for positioning the tape 27 in the mentioned first leg portion at one of its tape edges include a first reference surface 72 extending at the mentioned acute angle to the first supporting surface 81. Similarly, means for positioning the tape 27 in the second leg portion at its one tape edge 97 include a second reference surface 74 extending at an acute angle to the first supporting surface 81. The illustrated apparatus further includes means (block 46 differential screw 54) coupled to the second tape guide 32 for imposing on the tape 27 a yaw force or motion loading the tape at that one edge 97 against the first and second reference surfaces 72 and 74. In particular, the yaw motion imposing system includes means 45, 46 and 54 for tilting the second tape supporting surface 59 relative to the first tape guide 87. By way of example, and as indicated above, the second tape supporting surface 59 may be cylindrical, with the yaw motion imposing system including means 45, 46 and 54 for tilting that cylindrical tape supporting surface relative to the first tape guide 87.

In particular, the second tape guide may include a roller 32 having a cylindrical surface as the mentioned second tape supporting surface and including means, such as suitable bearings, for mounting that roller for rotation about an axis 32. In that case, the yaw motion imposing system may include means 45, 46 and 54 for tilting the roller 32 including its axis 53 relative to the first tape guide 87, as indicated by the arrows 51 and 52 in FIG. 2.

Means including the components 63, 62 and 61 may be connected to the second tape guide mount 44 for varying the length of the loop-shaped tape path 38.

The illustrated apparatus and the broad principles of the subject invention and its embodiments underlying same also provide a facility for selectively guiding tape of different width. For instance, FIG. 2 shows in solid outline a first tape having a first major tape surface 96 of a first width extending between first parallel tape edges 97 and 98 and advancing in a direction parallel to these first edges. By way of a dotted line 110, FIG. 2 also shows a second tape having a second major tape surface 112 of a second width extending between the dotted line 110 and the lower tape edge 97 and being different from the mentioned first width. The second major tape surface 112 thus extends between second parallel tape edges 97 and 110 and advances also in a direction parallel to these second edges.

The tape guide 87 according to the illustrated embodiment of the subject invention is designed for supporting either of the advancing tapes across its major tape surface 96 or 112. To this end, the guide 87 includes a first tape supporting surface having a third width corresponding to the mentioned first width of the first tape, and a second tape supporting surface having a fourth width corresponding to the second width of the second tape. In terms of FIG. 3, the portions of the tape supporting surface 81 shown at the right and left of the guide 87 have a height between the flange 71 and the top crossmember 89 equal to the mentioned third width.

Conversely, the central portion of the surface 81 seen in FIG. 3, as well as a diametrically opposed further portion of the supporting surface 81, have a height between the flange 71 and lower crossmembers 88 equal to the mentioned fourth width corresponding to the width of the second tape between edges 97 and 110.

Means for positioning the first tape 27 at one of its first tape edges 97 include a first reference surface 72 extending at the mentioned wider first tape supporting surface at an acute angle to that first surface. Conversely, means for positioning the second tape at one of its second tape edges 97 include a second reference surface 73 distinct and spaced from the first reference surface 72 and extending at the narrower second tape supporting surface at an acute angle to that second tape supporting surface.

As seen in FIG. 3, the mentioned first and second tape supporting surfaces may be part of a cylindrical surface 81 of the supporting structure or guide 87. That cylindrical surface 81, as well as its mounting means 83, 85 and 92 again cooperate in stressing either of the advancing tapes uniformly across the major tape surface 96 or 112 and at both of the parallel tape edges 97 and 98 or 110.

From another aspect thereof, the illustrated apparatus include a guide 87 located between the mentioned first and second leg portions of the loop-shaped tape path 38 for supporting either of the above mentioned advancing tapes across the major tape surface 96 or 112. To this end, the guide 87 has a cylindrical tape supporting surface 81 having at least the mentioned first width of the first tape 27 at essentially diametrically opposed first and second tape guiding regions of the cylindrical surface 81, and having at least the second width of the second tape at essentially diametrically opposed third and fourth tape guiding regions of the cylindrical surface 81. Means for positioning the first tape at one of its parallel tape edges 97 include a first reference surface facet 72 extending at the mentioned first tape guiding region at an acute angle to the cylindrical surface 81, and a second reference surface facet 74 extending at the second tape guiding region also at an acute angle to the cylindrical surface 81.

Similarly, the means 71 for positioning the second tape at one of its parallel edges 97 include a third reference surface facet 73 extending at an acute angle to the cylindrical surface 81, and a fourth reference surface facet 75 extending at the fourth tape guiding region at an acute angle to the cylindrical surface 81.

The mounting core 83, fastener 92 and Belleville springs 94, or equivalent components, constitute means coupled to the supporting device 87 for selectively positioning the first and second tape guiding regions of the surface 81 and the first and second reference surface facets 72 and 74 at the first and second leg portions, respectively, of the tape loop 38, for guiding and positioning the first tape 27, and for alternatively positioning the third and fourth tape guiding region of the surface 81 and the third and fourth reference surface facets 73 ad 75 at the first and second leg portions, respectively, for guiding and positioning the narrower second tape.

As indicated above, the flange 71 and guide 87 are angularly movable by about 90° for this purpose. While the illustrated embodiment places reliance on the clamping action of the fastener 92 for the purpose of releasably retaining the flange 71 and guide 87 in either angular position, indexing devices may, of course, be employed for this purpose.

As seen particularly in FIG. 4, each reference surface 72, 73, 74 and 75 typically is limited in length (99) to a fraction of the circumference of the cylindrical tape guide 87.

As before, the cylindrical surface 81 and its mounting means cooperate in stressing either of the advancing tapes uniformly across its major tape surface 96 or 112 and at both of its parallel edges 97, 98 or 110.

It will now be seen that the subject invention and its embodiments meet the initially stated objects and satisfy the above mentioned needs.

The subject extensive disclosure suggests or renders apparent to those skilled in the art various modifications and variations within the spirit and scope of the subject invention.

We claim:

1. A method of guiding a tape having a major tape surface extending between parallel tape edges, comprising in combination the steps of:
    providing a tape guide including a tape supporting surface for supporting said tape across said major tape surface;
    advancing said tape in a direction parallel to said edges;
    supporting said advancing tape with said tape supporting surface at a supporting region extending from a tape touchdown region to a tape liftoff region;
    stressing said advancing tape with said guide including said supporting surface uniformly across said tape and at both of said edges;
    positioning the tape at one of said tape edges with the aid of a reference surface;
    sloping said reference surface at an acute angle to said supporting surface; and
    limiting the extent of said reference surface in the direction of advance of the tape to a tape positioning region between said tape touchdown and liftoff regions.

2. A method of guiding a tape having a major tape surface extending between parallel tape edges, comprising in combination the steps of:
    providing a tape guide including a tape supporting surface for supporting said tape across said major tape surface;
    advancing said tape in a direction parallel to said edges;
    supporting said advancing tape with said tape supporting surface;
    stressing said advancing tape with said guide including said supporting surface uniformly across said tape and at both of said edges;
    positioning the tape at one of said tape edges with the aid of a reference surface;

sloping said reference surface at an acute angle to said supporting surface; and limiting said reference surface in the direction of advance of said tape to an extent corresponding to only a portion of said tape supporting surface in said direction.

3. A method of guiding a tape having a major tape surface extending between parallel tape edges, comprising in combination the steps of:

providing a tape guide including a tape supporting surface for supporting said tape across said major tape surface;

advancing said tape in a direction parallel to said edges;

supporting said advancing tape with said tape supporting surface at a supporting region extending from a tape touchdown region to a tape liftoff region;

stressing said advancing tape with said guide including said supporting surface uniformly across said tape and at both of said edges;

providing a reference surface at one side of said tape guide including said tape supporting surface;

imposing on said tape at a distance from said tape guide a yaw motion loading the tape at one of said tape edges against said reference surface;

preventing the tape at said one edge from curling up said reference surface by sloping said reference surface at an acute angle to said supporting surface; and preventing interference between said advancing tape and said reference surface by limiting the extent of said reference surface in the direction of advance of the tape to a tape positioning region between said tape touchdown and liftoff regions.

4. A method of guiding a tape having a major tape surface extending between parallel tape edges, comprising in combination the steps of:

providing a tape guide including a tape supporting surface for supporting said tape across said major tape surface;

advancing said tape in a direction parallel to said edges;

supporting said advancing tape with said tape supporting surface;

stressing said advancing tape with said guide including said supporting surface uniformly across said tape and at both of said edges;

providing a reference surface at one side of said tape guide including said tape supporting surface;

imposing on said tape at a distance from said tape guide a yaw motion loading the tape at one of said tape edges against said reference surface;

preventing the tape at said one edge from curling up said reference surface by sloping said reference surface at an acute angle to said supporting surface; and preventing interference between said advancing tape and said reference surface by limiting said reference surface in the direction of advance of said tape to an extent corresponding to only a portion of said tape supporting surface in said direction.

5. A method as claimed in claim 1, 2, 3 or 4, including the steps of:

curving said tape supporting surface in said direction of tape advance; and limiting said reference surface in the direction of curvature of said curved tape supporting surface to an extent corresponding to only a portion of said tape supporting surface in said direction of curvature.

6. A method as claimed in claim 1, 2, 3 or 4, including the steps of:

making said tape guide including said tape supporting surface cylindrical; and limiting said reference surface in length to a fraction of the circumference of said cylindrical tape guide.

7. A method as claimed in claim 1, 2, 3 or 4, including the step of:

providing said tape guide including said tape supporting surface with indentations.

8. A method as claimed in claim 1, 2, 3 or 4, including the step of:

providing said tape guide including said tape supporting surface with grooves extending in the direction of tape advance.

9. A method as claimed in claim 1, 2, 3 or 4, wherein:

said reference surface is maintained stationary during advance of said tape.

10. A method as claimed in claim 1, 2, 3 or 4, wherein:

said tape guide including said tape supporting surface and said reference surface are maintained stationary during advance of said tape.

11. Apparatus for guiding a tape having a major tape surface extending between parallel tape edges and advancing in a direction parallel to said edges, comprising in combination:

means extending across said major tape surface for supporting said advancing tape at a supporting region extending from a tape touchdown region to a tape liftoff region and including a tape supporting surface;

means for stressing said advancing tape with said supporting means including said tape supporting surface uniformly across said tape and at both of said edges, including means for mounting said supporting surface; and means for positioning the tape at one of said tape edges, including a reference surface extending at an acute angle to said supporting surface between and exclusive of said tape touchdown and liftoff regions.

12. Apparatus for guiding a tape having a major tape surface extending between parallel tape edges and advancing in a direction parallel to said edges, comprising in combination:

means extending across said major tape surface for supporting said advancing tape, including a tape supporting surface;

means for stressing said advancing tape with said supporting means including said tape supporting surface uniformly across said tape and at both of said edges, including means for mounting said supporting surface; and means for positioning the tape at one of said tape edges, including a reference surface extending at an acute angle to said supporting surface and extending for a length corresponding to only a portion of said tape supporting surface in said direction of tape advance.

13. Apparatus as claimed in claim 11 or 12, including:

means spaced from said supporting means for imposing on said tape a yaw motion loading the tape at one of said tape edges against said reference surface.

14. Apparatus as claimed in claim 13, wherein:

said yaw motion imposing means include further means for supporting said advancing tape including a further tape supporting surface, and means coupled to said further supporting means for tilting said further tape supporting surface relative to the first-mentioned tape supporting surface.

15. Apparatus as claimed in claim 13, wherein:
said yaw motion imposing means include a cylindrical surface for supporting said advancing tape at a distance from said supporting means and means for tilting said cylindrical surface relative to the first-mentioned tape supporting surface.

16. Apparatus as claimed in claim 13, wherein:
said yaw motion imposing means include a cylindrical surface for supporting said advancing tape at a distance from said supporting means, means for mounting said cylindrical surface for rotation about an axis, and means for tilting said cylindrical surface relative to the first-mentioned tape supporting surface.

17. Apparatus as claimed in claim 11 or 12, wherein:
said tape supporting surface is curved in the direction of tape advance; and
said reference surface is limited in the direction of curvature of said tape supporting surface to a length corresponding to only a portion of said tape supporting surface in said direction of curvature.

18. Apparatus as claimed in claim 11 or 12, wherein:
said tape supporting surface is cylindrical; and
said reference surface is limited in length to a fraction of the circumference of said cylindrical tape guide.

19. Apparatus as claimed in claim 11 or 12, wherein:
said supporting means including said tape supporting surface have indentations.

20. Apparatus as claimed in claim 11 or 12, wherein:
said supporting means including said tape supporting surface have grooves extending in the direction of tape advance.

21. Apparatus as claimed in claim 11 or 12, including:
means coupled to said positioning means for maintaining said reference surface stationary during advance of said tape.

22. Apparatus as claimed in claim 11 or 12, including:
means coupled to said supporting means and to said positioning means for maintaining said tape supporting surface and said tape positioning surface stationary during advance of said tape.

23. Apparatus for guiding a tape having a major tape surface extending between parallel tape edges, comprising in combination:
first tape guide means extending across said major tape surface for supporting said advancing tape and including a first tape supporting surface;
second tape guide means extending across said major tape surface for supporting said advancing tape and including a second tape supporting surface;
means for stressing said advancing tape with said first tape guide means including said first tape supporting surface uniformly across said tape and at both of said edges, including means connected to said first tape guide means for mounting said first tape supporting surface;
means connected to said second tape guide means for mounting said second tape guide means in spaced relationship to said first tape guide means;
means for advancing said tape in a loop-shaped tape path relative to said first and second tape guide means, with said loop-shaped tape path having a first leg portion touching said first tape supporting surface on one side of said first tape guide means, a second leg portion touching said first tape supporting surface on another side of said first tape guide means, and a bight portion interconnecting said first and second leg portions and extending about said second tape guide means in contact with said second tape supporting surface;
means for positioning the tape in said first leg portion at one of said tape edges, including a first reference surface extending at an acute angle to said first supporting surface;
means for positioning the tape in said second leg portion at said one tape edge, including a second reference surface extending at an acute angle to said first supporting surface; and
means coupled to said second tape guide means for imposing on said tape a yaw motion loading the tape at said one edge against said first and second reference surfaces.

24. Apparatus as claimed in claim 23, wherein:
said yaw motion imposing means include means for tilting said second tape supporting surface relative to said first tape guide means.

25. Apparatus as claimed in claim 25, wherein:
said second tape supporting surface is cylindrical; and
said yaw motion imposing means include means for tilting said cylindrical tape supporting surface relative to said first tape guide means.

26. Apparatus as claimed in claim 23, wherein:
said second tape guide means include a roller having a cylindrical surface as said second tape supporting surface, and means for mounting said roller for rotation about an axis; and
said yaw motion imposing means include means for tilting said roller including said axis relative to said first tape guide means.

27. Apparatus as claimed in claim 23, 24, 25 or 26, including:
means connected to said means for mounting said second tape guide means for varying the length of said loop-shaped tape path.

28. Apparatus for selectively guiding a first tape having a first major tape surface of a first width extending between first parallel tape edges and advancing in a direction parallel to said first edges, and alternatively a second tape having a second major tape surface of a second width different from said first width, extending between second parallel tape edges, and advancing in a direction parallel to said second edges, comprising in combination:
means for supporting either of said advancing tapes across its major tape surface, including a first tape supporting surface having a third width corresponding to said first width, and a second tape supporting surface having a fourth width corresponding to said second width;
means for positioning said first tape at one of said first tape edges, including a first reference surface extending at said first tape supporting surface at an acute angle to said first tape supporting surface; and
means for positioning said second tape at one of said second tape edges, including a second reference surface distinct and spaced from said first reference surface and extending at said second tape supporting surface at an acute angle to said second tape supporting surface.

29. Apparatus as claimed in claim 28, wherein:
said first and second tape supporting surfaces are part of a cylindrical surface of said supporting means.

30. Apparatus as claimed in claim 28 or 29, including:
means for stressing either of said advancing tapes with said supporting means uniformly across its major tape surface and at both of its parallel tape edges, including means for mounting said first and second tape supporting surfaces.

31. Apparatus for selectively guiding a first tape having a first major tape surface of a first width extending between first parallel tape edges, and alternatively a second tape having a second major tape surface of a second width different from said first width and extending between second parallel tape edges, comprising in combination:
means for advancing either of said tapes in a loop-shaped tape path having mutually spaced first and second leg portions;
means located between said first and second leg portions for supporting either of said advancing tapes across its major tape surface, including a cylindrical tape supporting surface having at least said first width at essentially diametrically opposed first and second tape guiding regions of said cylindrical surface, and having at least said second width at essentially diametrically opposed third and fourth tape guiding regions of said cylindrical surface;
means for positioning said first tape at one of its parallel tape edges, including a first reference surface facet extending at said first tape guiding region at an acute angle to said cylindrical surface, and a second reference surface facet extending at said second tape guiding region at an acute angle to said cylindrical surface;
means for positioning said second tape at one of its parallel tape edges, including a third reference surface facet extending at said third tape guiding region at an acute angle to said cylindrical surface, and a fourth reference surface facet extending at said fourth tape guiding region at an acute angle to said cylindrical surface; and
means coupled to said supporting means for selectively positioning said first and second tape guiding regions and first and second reference surface facets at said first and second leg portions, respectively, for guiding and positioning said first tape, and for alternatively positioning said third and fourth tape guiding regions and third and fourth reference surface facets at said first and second leg portions, respectively, for guiding and positioning said second tape.

32. Apparatus as claimed in claim 34, including:
means for stressing either of said advancing tapes with said cylindrical surface uniformly across its major tape surface and at both of its parallel tape edge, including means for mounting said supporting means.

* * * * *